United States Patent
Carroll et al.

(10) Patent No.: US 10,248,736 B1
(45) Date of Patent: Apr. 2, 2019

(54) DATA LOADER AND MAPPER TOOL

(71) Applicant: Sprint Communications Company L.P., Overland Park, KS (US)

(72) Inventors: Roberta M. Carroll, Platte City, MO (US); Carter Wayne Floyd, Jr., Overland Park, KS (US); Steven A. Hoskins, Raymore, MO (US); Kenneth W. Samson, Belton, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 254 days.

(21) Appl. No.: 15/269,602

(22) Filed: Sep. 19, 2016

(51) Int. Cl.
*G06F 17/30* (2006.01)
*H04L 29/08* (2006.01)

(52) U.S. Cl.
CPC .... *G06F 17/30899* (2013.01); *H04L 67/1095* (2013.01); *H04L 67/1097* (2013.01)

(58) Field of Classification Search
CPC ............. G06F 9/4881; G06F 17/30117; G06F 17/3089; G06F 17/30864; G06F 17/30; G06F 17/30595; G06F 8/34; G06F 17/30569; G06F 9/48; G06F 17/30899; Y10S 707/99943; H04L 67/1096; H04L 67/1097
See application file for complete search history.

(56) References Cited

U.S. PATENT DOCUMENTS

| 9,430,114 | B1 * | 8/2016 | Dingman | G06F 3/048 707/E17.014 |
| 2005/0050068 | A1 * | 3/2005 | Vaschillo | G06F 17/30569 707/E17.006 |
| 2012/0054174 | A1 * | 3/2012 | Gagnier | G06F 17/30241 707/714 |

* cited by examiner

*Primary Examiner* — Anh Ly

(57) ABSTRACT

A method of managing data in a telecommunication network data structure is disclosed. The method comprises receiving, by a translation application executing on a telecommunication network computer system, a request to translate source data stored in a source data structure to a target data structure; identifying, by way of information stored in a taxonomy repository, a data store key within the source data; a category of an element of the source data; inferring, by way of information stored in the taxonomy repository a relationship between the data store key and the element; converting, by the translation application, a format of the data store key to a format of a target data store key, and a format of the element to a format of a target element. The method further comprises storing, by the translation application, the target data store key and the target element in the target data structure.

17 Claims, 8 Drawing Sheets

DATA LOADER AND MAPPER TOOL

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Database management is a key aspect of daily operations for any entity. Various aspects of database management may include enabling end users to create, read, update, and delete data in a database. Challenges that database administrators may face include keeping costs down to manage the database, and ensuring data can be retrieved, updated, and stored in the database quickly and accurately.

Database administrators have a variety of computer software platforms to choose from when it comes to database management systems. The different computer software applications may not be compatible with each other as they may use different syntax, platforms, and formats. Generally a database is not portable across different data management systems. Any improvements that are made to the ability to shift and synchronize data, whether within the same database management system or within many different database management systems would be beneficial.

SUMMARY

In an embodiment, a telecommunication network computer system for converting source data in a source data structure to target data in a target data structure, where the source data structure and target data structure are arbitrarily selected from a plurality of at least fifty different data structures is disclosed. The telecommunication network computer system comprises a memory; a processor; and a program stored in the memory that, when executed by the processor causes the processor to automatically generate data store keys and inter-field relationships from a source data structure by further causing the processor to: receive a request to translate source data in a source data structure to a target data in a target data structure. The source data comprises one or more source tables stored in the source data structure, the one or more tables comprises a data store key and a first element, where the source data structure is different from the target data structure and automatically generate data store keys and inter-field relationships from the source data structure by further causing the processor to: based on information stored in a taxonomy repository, identify the data store key comprises key information; identify a category of the first element; and identify a relationship between the data store key and the first element in the one or more source tables. The program further causes the processor to convert a format of the data store key to a format of a target data store key; convert a format of the first element to a format of a target element; and store the target data store key and the target element in the target data structure.

In an embodiment, a telecommunication network computer system for converting source data in a source data structure to target data in a target data structure, where the source data structure and target data structure are arbitrarily selected from a plurality of at least fifty different data structures is disclosed. The telecommunication network computer system comprises a memory, a processor, and a program stored in memory that, when executed by the processor causes the processor to receive a request to translate data from a source data structure to a target data structure, the source data structure comprising a first table of data and a second table of data. The program further causes the processor to infer relationships among fields by further causing the processor to access a taxonomy repository related to a database of a telecommunications entity and identify a relationship between elements in the source data structure based on information in the taxonomy repository 112. The program further causes the processor to access the taxonomy repository and identify a category of a column of data in the first table and a category of a column of data in the second table. The program further causes the processor to determine the categories of data are the same; compare data in the column of data in the first table and in the column of data in the second table; and based on the comparison, determine that duplicate elements are present between the column of data in the first table and the column of data in the second table. The program further causes the processor to determine the first table comprises the data store of record based on information in the taxonomy repository; and translate the first table of data and the second table of data to the target data structure, translating one instance of the duplicate elements in the target data structure from the first table.

In an embodiment, a method of managing data in a telecommunication network data structure by converting source data in a source data structure to target data in a target data structure, where the source data structure and target data structure are arbitrarily selected from a plurality of at least fifty different data structures is disclosed. The method comprises receiving, by a translation application executing on a telecommunication network computer system, a request to translate source data stored in a source data structure to a target data structure. The method further comprises identifying, by way of information stored in a taxonomy repository, a data store key within the source data; a category of an element of the source data; and inferring, by way of information stored in the taxonomy repository, a relationship between the data store key and the element. The method further comprises converting, by the translation application, a format of the data store key to a format of a target data store key, and converting, by the translation application, a format of the element to a format of a target element. The method further comprises storing, by the translation application, the target data store key and the target element in the target data structure.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
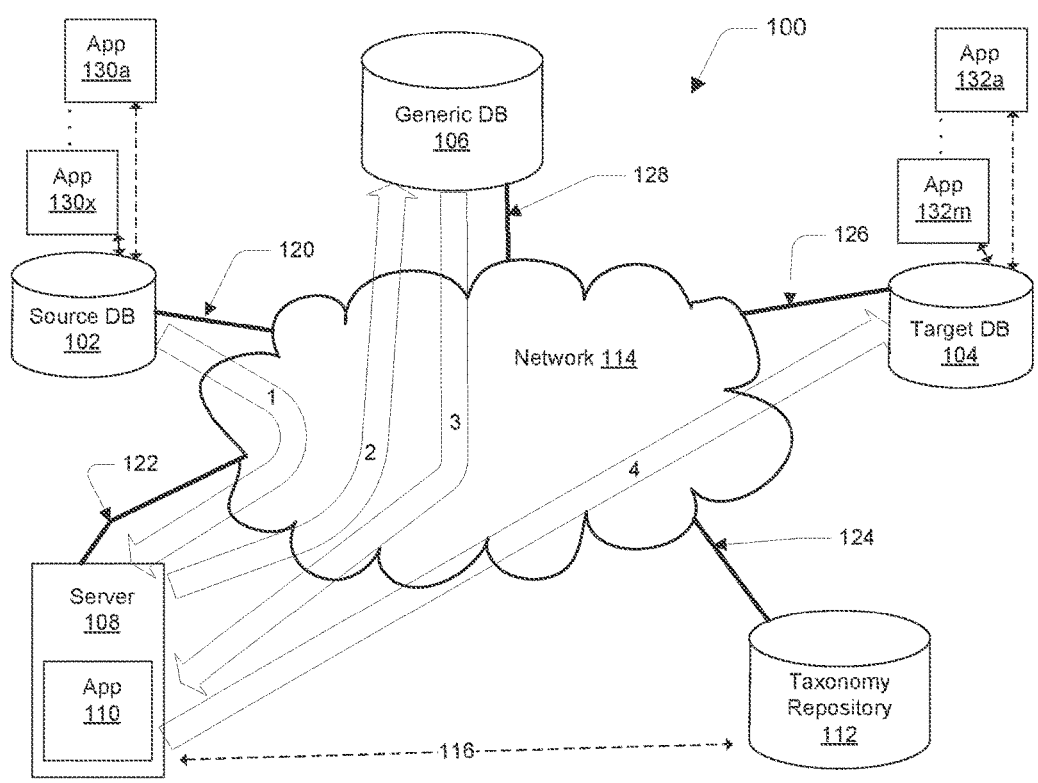
FIG. 1 is an illustration of an environment according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As we continue into the digital age, we continue to amass a large amount of data corresponding to various aspects of our lives or an entity's business stored in various databases. The entity's data may include information corresponding to an entity's customers, products, and other intellectual property owned by the entity. Various entities ranging from developers, startups, small companies and large companies allocate resources into managing the large amount of data.

During the course of operations, entities make decisions such as which database platform to use and how to manage the data in the databases. Some entities may choose to store information in a single database, other entities may face a situation in which data is stored in different and disparate databases. This might occur, for example, if a company acquires another company and inherits data and data platforms during the acquisition of the other company.

A challenge faced by database administrators may include moving data around in disparate database structures in an efficient manner without sacrificing quality or integrity of the data. For example, an entity might choose to move data off of a current database structure to a different database structure that fits the entity's needs better. Currently, the cost of such an undertaking is daunting and may deter an entity from making the switch. Additionally, because an entity may manage various disparate databases containing data that overlap, finding a system that allows users or database administrators to harmonize the data between the disparate databases would be beneficial.

In order to address such problems, an application tool may be leveraged to automatically map from source data stores to destination data stores in an arbitrary and automated fashion. This automated action is promoted by relying on a taxonomy repository to determine relationships among data store fields, and also to identify a database of record for specific fields. Accordingly, a taxonomy repository summarizes information about multiple database structures, including a category of various data contained in a particular database structure, and a structure of the database structure including formatting of different types of data and relationships between the various data in the particular database structure.

The present disclosure teaches a system and method for converting source data in a source data structure to target data in a target data structure, where the source data structure and target data structure are arbitrarily selected from a plurality of at least fifty different data structures. The disclosure further teaches converting source data in a plurality of source data structures to target data in a single target data structure.

Thus, in some instances, the application tool and the taxonomy repository may be used in combination to determine taxonomy of data and infer relationship information of data in a database structure to perform operations such as harmonizing disparate databases or translating data from one database to another in an efficient and accurate manner. Through the use of the application tool and the taxonomy repository, mappings may occur across multiple database formats to one or more destination formats. For example, two or three data stores in a first database format may be mapped and loaded to a different data store in a second database format. In another example, two data stores plus an Excel spreadsheet file may be mapped and loaded to a different data store in a different database format. The mapping and loading can go in the opposite direction as well.

The application tool may be used to transfer data between two different database structures or to harmonize data between different database structures. The application tool may translate data from a source database structure to a target database structure through the use of an intermediate or generic database structure. Thus, the application tool may convert data in a source database format to a generic database format and then from the generic database format to the target database format. The application tool may access the information stored in the taxonomy repository and leverage the information when translating data from one database structure to another using the generic database structure or when harmonizing data between two different database structures. For example, by leveraging the information stored in the taxonomy repository, the application tool may recognize that duplicate entries exist in a database or between databases and the application tool may harmonize the data such that the duplicate entries are consolidated to one.

Turning now to FIG. 1, an environment 100 is described. As depicted, environment 100 comprises various databases such as a source database 102, a target database 104, a generic database 106, and a taxonomy repository 112. Although single instances of a source database 102 and a target database 104 are illustrated, there may be many different source databases and target databases. In some embodiments, environment 100 may depict a network topology owned and operated by a single entity. An example environment 100 may be a telecommunication network environment in which the single entity comprises a telecommunication service provider. The telecommunication service provider may own and operate source database 102 that may be accessed by various applications 130a, . . . , 130x during the course of operation of the applications 130a, . . . , 130x. Different applications 132a, . . . , 132m may access target database 104 during the course of operation of the applications 132a, . . . , 132m. In other embodiments different entities may own and operate source database 102 and target database 104. A method for transferring data from source database 102 to target database 104 by leveraging a central repository such as the taxonomy repository 112 is taught herein.

Databases 102 and 104 may have different architectures or structures and may differ in the manner in which data collection is stored, managed and administered. For example, databases 102 and 104 may utilize various database management systems such as a relationship database management system (e.g., Oracle, SQLServer, IBM DB2, mySQL, SQLite, and PostgreSQL, etc.), a flat file based database management system (e.g., CSV (Comma Separated Values), Excel, etc.), and a hierarchical database management system (e.g., XML document, etc.). One or more of the databases 102 and 104 may also utilize the Lightweight Directory Access Protocol (LDAP) database management system. Similarly a structure of the generic database 106 or taxonomy repository 112 may be modeled after such systems as described with regards to databases 102 or 104.

The different databases 102, 104, 106, and taxonomy repository 112 may exchange data between each other by way of network 114. Each component may have an individual connection to the network 114. For example, each database, repository and server may be connected to the network 114 by a respective data link 120, 122, 124, 126, and 128 which may represent a wired or wireless data connection. The network 114 may be any kind of data network in which computers, nodes, servers, or other computing devices may exchange data with each other.

Aside from the databases 102, 104, 106, and taxonomy repository 112 connected to network 114, a server 108 is connected to network 114. The server 108 may host application 110 which may provide a tool that enables a user to transfer data between disparate databases. In various embodiments, databases may be considered disparate if they utilize different platforms or architectures to organize the data, such as different data structures, or different syntax to store, manage, and access the data. Furthermore, the databases may be disparate between different versions of the same platform.

In some embodiments, the application 110 may leverage information in a taxonomy repository 112 during a transfer of data between databases 102 and 104. As an example, an entity might currently store data in source database 102. The entity may wish to change database platforms that utilize database structures in target database 104. The entity may utilize application 110 hosted on server 108 to perform a translation of data from the source database 102 to the target database 104. As used herein, translation refers to the application 110 copying and converting data from the source database 102 to the target database 104. The conversion may entail converting a format of data as well as changing the structure of data structures comprising the data to be translated. In various embodiments, conversion may entail converting data from the source database 102 to a generic format and subsequently converting the data in the generic format to a format compatible with the target database 104. The data converted to the generic format may be stored in the generic database 106. Alternatively, the data in generic format may be stored on server 108 or any other database or computing device accessible by application 110.

The application 110 may have capabilities to consolidate duplicate data in source database 102 during a transfer of data from source database 102 to target database 104. In another example, an entity may own and operate both the source database 102 and the target database 104. Over time, applications accessing each database 102 and 104 may store duplicate information corresponding to a particular data record or data entry. Application 110 may be used to harmonize data between both databases 102 and 104 by using the application 110.

Harmonizing data may be distinguished from synchronizing data between two or more data sources. Synchronizing may refer to ensuring that data between two or more data sources is the same. Thus, synchronizing may entail creating records in one data source to match records in another data source and vice versa. Harmonizing refers to identifying a version of data that serves as the data of record and updating records in one or more databases to match the data of record. Thus harmonizing incorporates a normalization component that may not be included in a method that synchronizes data between two or more data sources.

In various embodiments, application 110 may comprise a number of methods or subroutines, each of which converts from a specific database format to a generic format. The application 110 may have a number of other methods or subroutines each of which converts from the generic format to a specific database format. This reduces the number of methods or routines that may otherwise be used to convert from a source database format to a target database format.

For example, suppose there are database formats A, B, C, D, E, and F. In an exemplary embodiment, application 110 may comprise a total of twelve methods as follows:

1: A→generic format
2: B→generic format
3: C→generic format
4: D→generic format
5: E→generic format
6. F→generic format
7. generic format→A
8. generic format→B
9. generic format→C
10. generic format→D
11. generic format→E
12. generic format→F Thus to convert from database format B to E, application 110 may call on method two to convert data in B format to the generic format. The application 110 may store the data in the generic format in generic database 106. Next application 110 may call on method 11 to convert data in the generic format to data in E format.

In large enterprises, there may be over one thousand different databases and an arbitrary translation from any one of those one thousand different databases to a different database may be desired. In examples where a direct translation is done, this may entail n(n−1) direct translation methods or subroutines implemented on application 110. In one example, where an entity uses eighteen-hundred databases, this may lead to implementing 3,238,200 methods or subroutines within application 110. By contrast, a method implementing translations from one database type to another database type using an intermediate generic structure may entail implementing 2n methods or subroutines in application 110. Thus, in the example of an entity using eighteen-hundred databases, this may lead to implementing thirty-six hundred methods. Thus a fewer number of methods or subroutines may be implemented in application 110 to obtain an end result of translating from one type of database type to another.

Taxonomy repository 112, which may be referred to as a central repository, may track various aspects of a database for all databases that may be present within environment 100. For example, within environment 100 more than one thousand databases may be present with different data structures and where some of them contain duplicative data. The taxonomy repository 112 may comprise a catalogue of terms corresponding to data elements where a data element may comprise a data entry or portions of one or more data entries stored in a database. The catalogue of terms may reference an element of data, or the catalogue may reference terms that might be included in a specific entry of data. For example, a database may comprise customer records including names, addresses, and products purchased by one or more customers. Accordingly, the catalogue of terms in the taxonomy repository 112 may include terms such as "name," "address," and "product," referencing a category of data. Additionally, the catalogue of terms may reference formats in which the respective categories of data "name," "address," and "product," are stored in.

In various embodiments, a category of data may comprise among other things, the heading name of the column comprising the data as well as a grouping for the data where the heading name and the grouping are defined in the catalogue of terms according to a generic database structure. Accordingly, data in a column named "account id" may be identified in the catalogue of terms as having a category of "identifier," where the category "identifier" is defined in the generic database structure. The column may be identified by a name, tag, metadata, etc. Additionally, references to columns in this disclosure may also be expanded to data structures in which data in one category is stored in a row as opposed to a column.

As another example, the taxonomy repository 112 may be leveraged by the application 110 during a request to translate data from a source database 102 to a target database 104. The source database 102 may have a set of data entries for billing account numbers, stored in a column identified as "account id." The target database, to which this data will be translated to, may save billing account numbers under the identifier "ban id." The taxonomy repository 112 may identify that both sets of data contain the same type or category of data (i.e., billing account numbers), that is, the taxonomy repository 112 will contain information linking the two sets of data in the respective source database 102 and target database 104 containing billing account numbers. In this manner, the taxonomy repository 112 may contain mappings of categories of data stored in different databases.

The taxonomy repository 112 also contains information corresponding to locations in the source database 102 and target database 104 where the entries of billing account numbers are. Thus, during a translating of the column of billing account numbers from the source database 102 to the target database 104, this information in the taxonomy repository 112 may be leveraged by the application 110 to identify that "account id," and "ban id" contain the same category or type of information and to identify a location within the target database 104 to translate the billing account numbers into.

Additionally, the taxonomy repository 112 may include terms directed to specific entries in database records. For example a product might be entered in a database as "blck jkt," referencing an item (black jacket) that a customer purchased. A corresponding term in the taxonomy repository 112 may be "Black Jacket." Thus the taxonomy repository 112 might include means to normalize data in different databases as data is being translated from one to the other. Thus the taxonomy repository 112 may map source of information (e.g., where the data is located in a specific database) and the way the data is described (e.g., a category of the data or the way data is described).

The taxonomy repository 112 may also map a format of data stored in the database. For example, the taxonomy repository may contain information about whether a source database 102 or target database 104 stores specific entries as an integer number, decimal number, long data (might be specific to database platform), long raw data, text, blob, etc. Additionally, the taxonomy repository may contain information about the structure of the databases, for example, whether a database contains data in an Oracle format or Excel format, etc. Accordingly, the taxonomy repository 112 may be leveraged by the application 110 during translation of data from one database to another to determine a format to convert data to before being copied into another database.

The taxonomy repository 112 may also map relationships between data elements in a database. The taxonomy repository 112 may contain information such as internal unique identifiers specific to one table (e.g., primary keys) and relations between two tables (i.e., foreign key) and the data corresponding to identified keys. Included in the information in the taxonomy repository 112 about the structure of various databases may be information about the structures of keys in a particular database. Accordingly, when data is translated from a source database 102 to target database 104, application 110 may leverage information in taxonomy repository 112 to identify keys in the data stored in source database 102 and preserve relationships between data when data is translated into the target database 104. Application 110 may convert a key structure from the source database 102 to a key structure identified by the taxonomy repository 112 as compatible with the target database 104.

Still referring to FIG. 1, application 110 may be written in any programming language. In one embodiment, application 110 may be written in JAVA. Application 110 may be run either in a desktop environment or on a server such as server 108. In various embodiments, application 110 may render a display to a user through which a user can indicate data he wants translated from one database, such as the source database 102 to another database, such as the target database 104. The display may be rendered by way of a webpage, and may be programmed using JAVA Server Page (JSP) or any other technology used to control the content or appearance of web pages, or any other program used to render displays to a user.

During a translation, an application 110 may utilize a generic database 106. Although generic database 106 is shown as a separate data container, the operations and functionality of the generic database 106 may occur at any location in environment 100 or across multiple locations some of which are depicted in environment 100. For example, the function of the generic database 106 may be carried out on the server 108 or in the taxonomy repository 112 or both.

In various embodiments, the generic database 106 may serve as a location to store data during a translation, from which data is copied into a destination database. As discussed previously, the use of a generic database structure may reduce the number of methods or subroutines that may be implemented overall in application 110 to handle translating between arbitrary and disparate databases.

As an illustration, a logical flow of steps that might occur is depicted by the arrows numbered from 1 to 4 in FIG. 1. Initially, a user may access the application 110 and request that application 110 translate data from source database 102 to target database 104. Accordingly, as shown by the arrow labeled 1, the application 110 may retrieve copies of the data from source database 102. The application 110 may access the taxonomy repository 112 by way of data connection 116, which may comprise a wired or wireless connection, to identify the structure of source database 102, format of data stored in the source database 102, relationships of data in the source database 102, categories of data stored in the source database 102, among other information and metadata regarding the data to be translated from the source database 102.

As depicted by the arrow labeled 2, the application 110 may convert the data to be translated from the source database 102 to a generic structure stored in the generic database 106. For example, the data may be stored in the generic database 106 using XML to represent the data structure of the source database 102. The application 110 may access the taxonomy repository 112 to determine information about the target database 104, such as structure of the target database 104, format of data stored in the target database 104, and locations of different categories of data.

The application 110 may cause the data stored in the generic database 106 to be converted to a structure and format compatible with target database 104 and copy the data to the target database 104 as depicted by the arrows labeled 3 and 4. The application 110 may translate the data in the generic database 106 and copy the data from the generic database 106 to the target database 104. In some embodiments, the conversion and copying of the data may occur directly from generic database 106 to target database 104. That is, the data may be moved directly from the generic database 106 to the target database 104. In other embodiments, the data may be moved off the generic database 106, stored temporarily on the server 108 and then moved into the target database 104. Based on information in the taxonomy repository 112, the application 110 determines a location for the data being translated, an appropriate format for the data being translated as well as maintains relationships between the data and stores the data in the target database 104. Although data has been described as being translated from the source database 102 to the target database 104 in this example, data may flow in either direction. Thus application 110 may perform a translation of data from the target database 104 to the source database 102.

Figure 2:
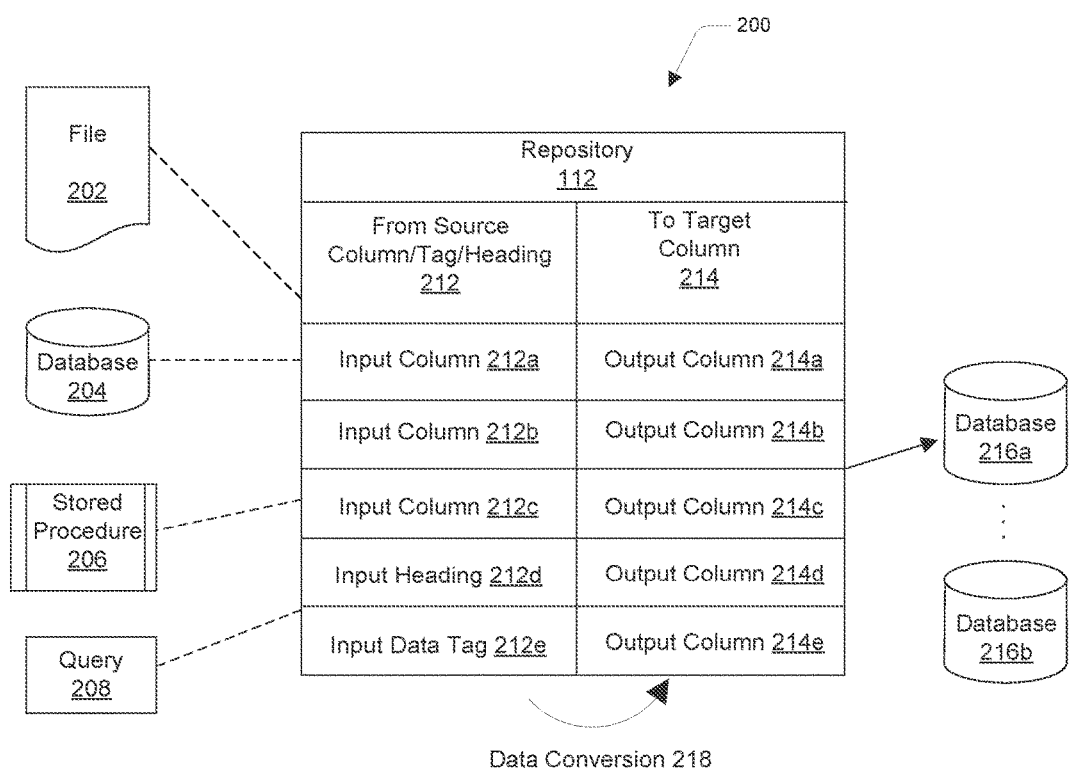
FIG. 2 is an illustration of an additional environment according to an embodiment of the disclosure.

Turning now to FIG. 2, an additional environment 200 according to an embodiment of the disclosure is shown. In particular, FIG. 2 depicts various translations that may occur between different databases. Source data may originate from a file 202, a database 204, a stored procedure 206, and/or a query 208. The file 202 may be a text file, or an excel file, for example. Database 204 may be any database as discussed above (i.e., a relationship database management system, a flat file based database management system, a hierarchical database management system, etc.). Stored procedure 206 and query 208 may be parsed to access data in a system. As shown in repository 112, which is the same as taxonomy repository 112 discussed in FIG. 1, metadata from a source data may be stored in the taxonomy repository 112. For example, from the disparate sources 202, 204, 206, and 208 columns, tags, and headings may be mapped and stored in column 212. Thus a variety of information or metadata such as input columns 212a, 212b, and 212c may be stored in the repository 112. Additionally an input heading 212d and input data tag 212e may also be mapped in the taxonomy repository 112.

A data conversion 218 may be performed and corresponding output columns 214a, 214b, 214c, 214d, and 214e may be stored in the taxonomy repository 112 in the target column 214. The application 110 may subsequently transfer the converted data to database 216a. Alternatively, the application 110 may transfer the converted data to one or more databases 216a and 216b. Thus the application 110, by leveraging the repository 112 may perform a multiple in to multiple out translation. For example, application 110 may translate data from tables in disparate platforms, consolidate the data and store the data in a destination database. For example, application 110 may translate data from tables in MySQL, Oracle, and Excel and consolidate the data into one table that is stored in the destination database. During the translation, consolidation may entail an output that no longer comprises three different disparate tables. Instead, the output table may have a reduced number of foreign keys, and the structure of the tables may be changed to be compatible with the destination database. The output data may be stored in one or more destination databases.

Figure 3:
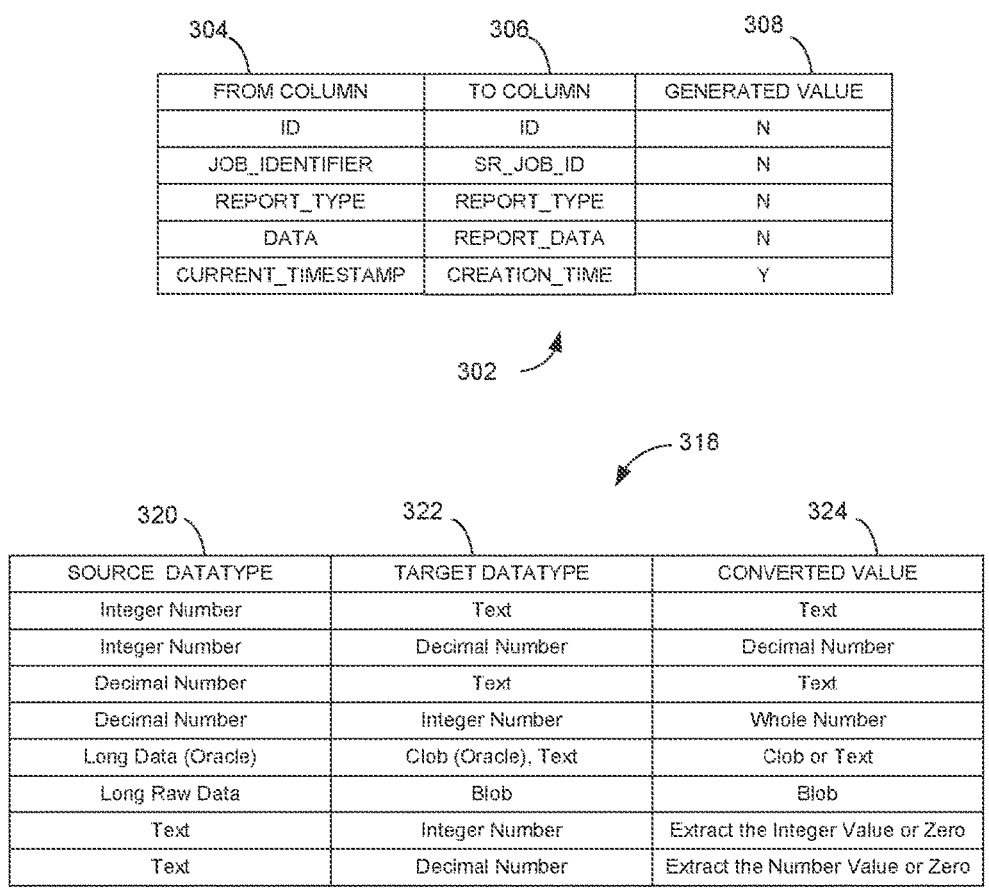
FIG. 3 is an illustration of data conversion according to an embodiment of the disclosure.

Turning now to FIG. 3, additional examples are shown depicting a mapping of data as well as conversions of a format of data that might be performed by application 110, based on information stored in the taxonomy repository 112. Tables 302 and 318 may be stored in taxonomy repository 112. In various embodiments, a user may have the ability to map from source data to target data based on column names or tags. As shown in table 302, the application 110 may extract the "from column" 304, the "to column" 306 and the "generated value" 308. Continuing the example in which a request is received by the application 110 to translate data from the source database 102 to the target database 104, the "from column" 304 may contain column names of tables located in a source database 102. The "from column" 304 may contain column names of tables as well as tags in the source data located in the source database 102. The entries in column 304 are mapped to corresponding column names or tags of the data in the target database 104 in the column 306.

As shown, columns containing the same category of data between the source database 102 and the target database 104 may be mapped despite having different column names. For example, data belonging to a category of job identifier may be identified as "JOB_IDENTIFIER" in the source database 102 and "SR_JOB_ID" in the target database 104. The application 110 may identify that these columns contain the same kind of information based on the table 302 stored in the repository 112 and leverage this information when translating data from the source database 102 to the target database 104. For example, the application 110 may translate data in the column "JOB_IDENTIFIER" in the source database 102 and store the translated data in the column "SR_JOB_ID" in the target database 104.

In some embodiments, table 302 may reflect a generated value associated with entries in the table 302. The generated value allows a user to specify certain SQL select commands such as "CURRENT_TIME_STAMP." The SQL select commands may be listed in the "from column" 304 and the generated value 308 is set to "Y."

If no mapping data is specified in table 302, then that application 110 may match the column names from source structure in the source database 102 to the destination structure in the destination database 104. In such a manner, columns and tags may be mapped between data in the source database 102 and the destination database 104.

Still referencing FIG. 3, table 318 stored in the taxonomy repository 112 may define formats of data stored in data structures in both the source database 102 and target database 104. As illustrated, column 320 references data formats in the source database 102 and may include formats such as integer number, decimal number, long data, long raw data, and text. Similarly, column 322 references data formats in the target database 104 and may include formats such as text, decimal number, integer number, clob, and blob. These example formats are merely representative of various formats and not meant to be an exhaustive list of formats of data in the data structures stored in the source database 102 and target database 104.

Application 110 may extract information from table 318 during a translation of data from the source database 102 to the target database 104. In particular, the application 110 may reference a table such as table 318 to determine a format to convert data to when performing a conversion. Column 324 in table 318 may capture a format that data may be converted to given a particular format of data in the source database 102 and a particular target format of data in the target database 104. When translating data between the source database 102 to the target database 104, the application 110 may convert the data to the format depicted in column 324.

In particular, column 324 may capture how application 110 should resolve discrepancies between a source format and a target format. For example, if a format of data in the source data structure is text, and a location where the data is to be stored in the target data structure uses a decimal number format, the table 318 defines a format the data should be converted to application 110. Accordingly, the application 110 may convert the data to the format provided by table 318 by extracting the number value from the text or storing the value as zero if no number value can be extracted. In various embodiments, the application 110 may determine where to store data after a conversion based on the mapping between columns, such as was discussed with regards to table 302. In other embodiments, the format to which data should be converted to may be based on a determined location to store the data in the target database 104.

Figure 4:
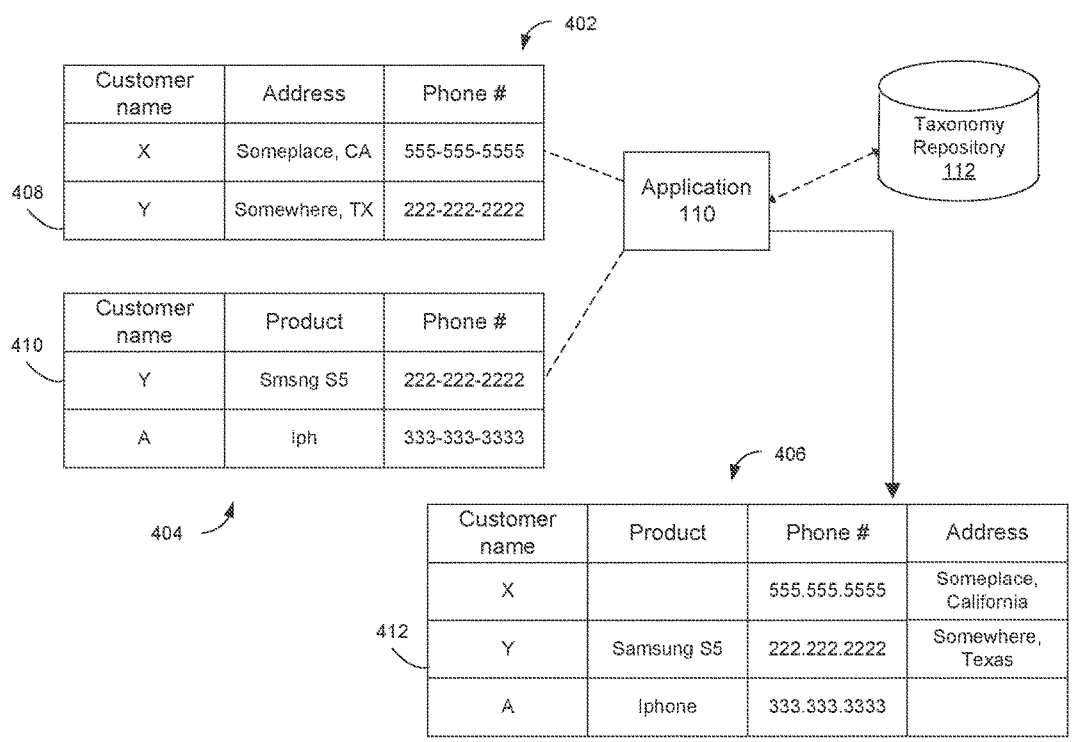
FIG. 4 is an illustration of an environment according to an embodiment of the disclosure.

Turning now to FIG. 4, another environment according to an embodiment is illustrated. In particular an example of leveraging a central repository such as taxonomy repository 112 to consolidate duplicate entries is shown. Tables 402 and 404 contain data that may be translated to a destination such as target database 104. Tables 402 and 404 may originate from the same source, such as source database 102. Tables 402 and 404 may also reside in disparate and separate databases. For example, table 402 may originate in an excel file, or a file such as file 202. And table 402 may originate in source database 102.

As shown, table 402 contains information corresponding to customers "X" and "Y." For example, table 402 stores addresses and phone numbers for customers "X" and "Y." Table 404, residing either in the same database or in a disparate and different database comprises information corresponding to customers "Y" and "A." In an example, customer "Y" in table 402 and customer "Y" in table 404 reference the same customer. Table 404 contains information corresponding to customers "Y" and "A" including products purchased by each customer and a phone number of the customer.

In one example, the application 110 may receive a request to translate data from tables 402 and 404 to a target destination such as target database 104. Application 110 may leverage information in a central repository such as taxonomy repository 112 to determine various factors, such as a location in the target database 104 to store the translated data to, a datastore of record in the scenario where duplicate data entries are detected, as well as whether elements within the tables may be consolidated so as to eliminate translating duplicate data. Thus application 110 may leverage information in the taxonomy repository 112 to determine a location, a structure, and format of various elements in the table 406 to be stored in the target database 104 based on information stored in the taxonomy repository 112 corresponding to the target database 104. Accordingly, application 110 may access the taxonomy repository 112 to determine that entry 408 and entry 410 correspond to the same customer "Y." During a translation of data from tables 402 and 404 to table 406, application 110 may determine a format to convert the data from tables 402 and 404 to.

Application 110 may also determine that duplicates or similar data exists between the two tables and refrain from translating similar data between the two tables. For example, application 110 may determine that certain data, such as the stored phone numbers for customer "Y" are the same. Application 110 may determine which table is the datastore of record based on information in the taxonomy repository 112. For example, taxonomy repository 112 may indicate that in the event of duplicate entries, table 404 is the datastore of record. Thus, when duplicate entries are detected between tables 402 and 404 (e.g., two phone number entries for customer "Y"), during a translation of the data entries in tables 402 and 404, entries in 404 will be translated. Thus in this example, the phone number "222-222-2222" is translated from table 404 to table 406 during the translation, instead of "555-555-5555" from table 402. Thus, instead of creating two entries for customer "Y," a table 406 may comprise a single entry for customer "Y" reflecting a single phone number for "Y." By leveraging information in the taxonomy repository 112, an application 110 may consolidate the two tables 402 and 404, comprising four rows between them into a single table in the target database 104 comprising three rows.

The ability of application to consolidate data is not confined to just the manner described with regard to FIG. 4 but extends to other aspects of data structures as well. For example, application 110, by leveraging information in the taxonomy repository 112, may also identify keys and key structures in a table. Application 110, by leveraging information in the taxonomy repository 112, may consolidate the number of keys in various tables as well. For example, in tables 402 and 404, "Y" may be a considered a primary key to the remaining data in the rows 408 and 410. Instead of simply copying both keys "Y" and creating two separate entries for the keys "Y," an application 110 may leverage information in the taxonomy repository 112 and identify that "Y" is a key and also collapse the entries to one. In the final table 406, the primary key "Y" references both product information (found in table 404) and address information (found in table 402) using one key "Y" in row 412.

Figure 5:
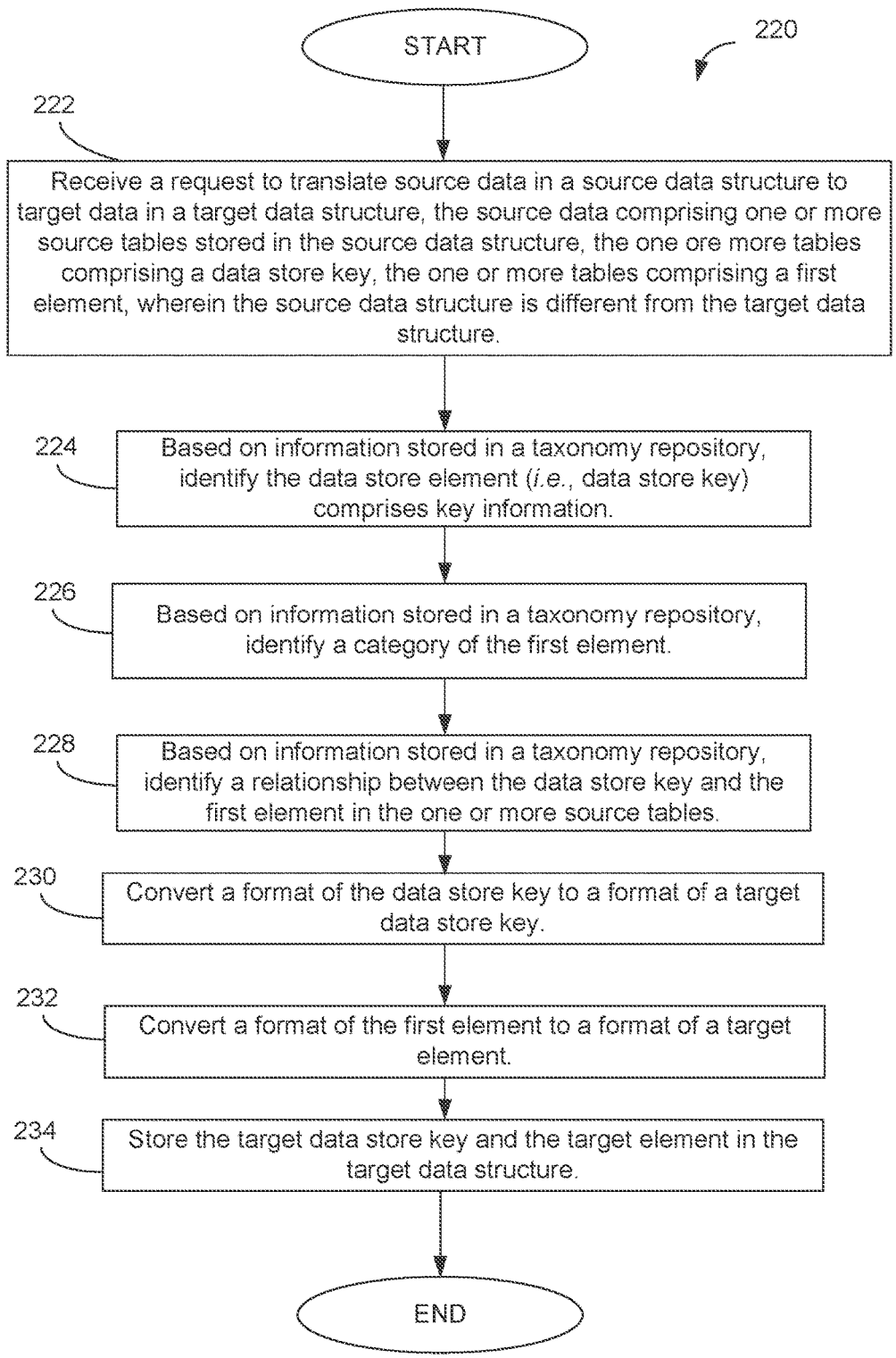
FIG. 5 is a flow chart illustrating a method according to an embodiment of the disclosure.

Turning now to FIG. 5, a method 220 is described. The method receives a request to translate data from a source data structure to a target data structure. In various embodiments, some of the blocks shown in FIG. 5 may be performed concurrently, in a different order than shown, or omitted. Additional method elements may be performed as desired.

At block 222, an application 110 receives a request to translate source data in a source data structure to target data in a target data structure. The source data may comprise one or more source tables in the source data structure. The one or more tables may comprise a data store key, the one or more tables may also comprise a first element. The source data structure is different from the target data structure. For example the source data structure may comprise an EXCEL structure whereas the target data structure may comprise an ORACLE database structure.

At block 224, based on information stored in a taxonomy repository, the application 110 may identify that the data store element comprises key information. That is, the application 110 may identify that the data store key is a primary key to corresponding information in the one or more tables. At block 226, based on information stored in the taxonomy repository 112, the application 110 identifies a category of the first element. Accordingly, the application 110 may identify a column heading name of the first element. Furthermore, the application 110 may extract information about the first element and column heading from the taxonomy repository 112. At block 228, based on information stored in a taxonomy repository 112, the application 110 may identify a relationship between the data store key and the first element in the one or more source tables. For example, the application may identify the data store key is a primary key to the first element.

At block 230, the application 110 may convert the format of the source data store key to a format of a target data store key. The application 110 may reference information in the taxonomy repository 112 to determine an appropriate format or structure to convert the data store key; where the appropriate format is compatible with the target database structure. At block 232, the application 110 may convert a format of the first element to a format of the target element. Similar to the previous step, the application 110 may reference information in the taxonomy repository 112 to determine an appropriate format to covert the first element to; where the appropriate format is compatible with the target database structure. At block 234, the application 110 may store the target data store key and the target element in the target data structure.

Figure 6:
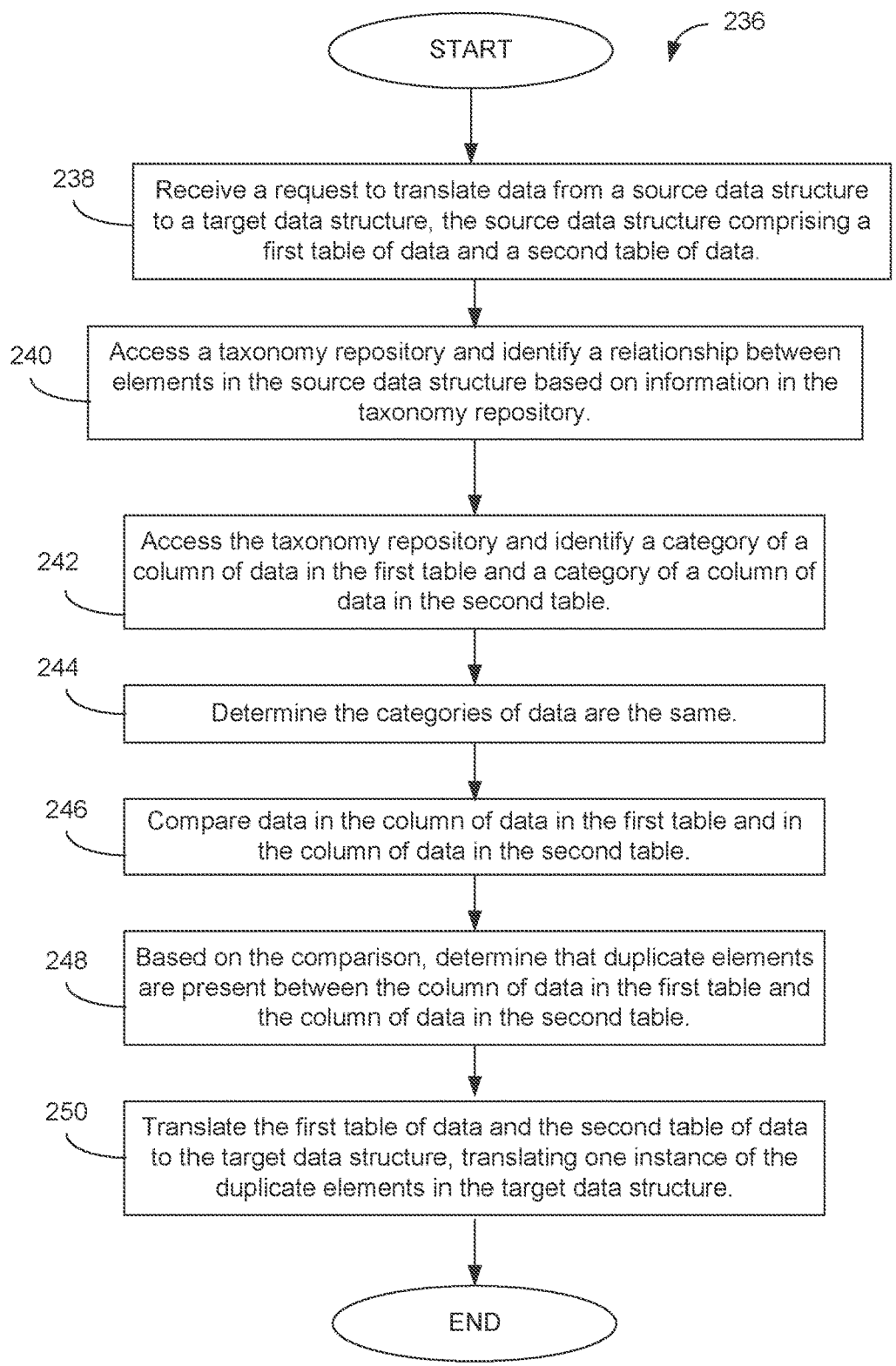
FIG. 6 is a flow chart illustrating a method according to an embodiment of the disclosure.

Turning now to FIG. 6, a method 236 is described in which an application receives a request to translate data from a source data structure to a target data structure. In various embodiments, some of the blocks shown in FIG. 6 may be performed concurrently, in a different order than shown, or omitted. Additional method elements may be performed as desired. Additional method elements may be performed as desired.

At block 238, an application receives a request to translate data from a source data structure to a target data structure. The source data structure may comprise a first table of data and a second table of data. The source data structure may reside in a database such as source database 102. At block 240, the application, such as application 110, may access a taxonomy repository 112 and identify a relationship between elements in the source data structure based on information in the taxonomy repository 112.

At block 242, the application may access the taxonomy repository and identify a category of a column of data in the first table and a category of a column of data in the second table. At block 244, the application 110 may determine the categories of data are the same. For example, the application may identify the name of the columns of data in the first and second tables as referencing an account identifier, based on information in the taxonomy repository. Based on both columns referencing an account identifier, the application 110 may determine that the categories of data are the same.

At block 246, application 110 may compare data in the column of data in the first table and in the column of data in the second table. Thus, the application 110 may compare data in two columns referencing account identifiers. At block 248, based on the comparison, the application may determine that duplicate elements are present between the column of data in the first table and the column of data in the second table. Accordingly, the application 110 may determine the same account identifiers are located in the first and second tables.

At block 250, the application 110 may translate the first table of data and the second table of data to the target data structure, translating one instance of the duplicate elements in the target data structure. Continuing the example, the application 110 may consolidate the duplicate account identifiers by creating only a single entry in the target data structure comprising the account identifier.

Figure 7:
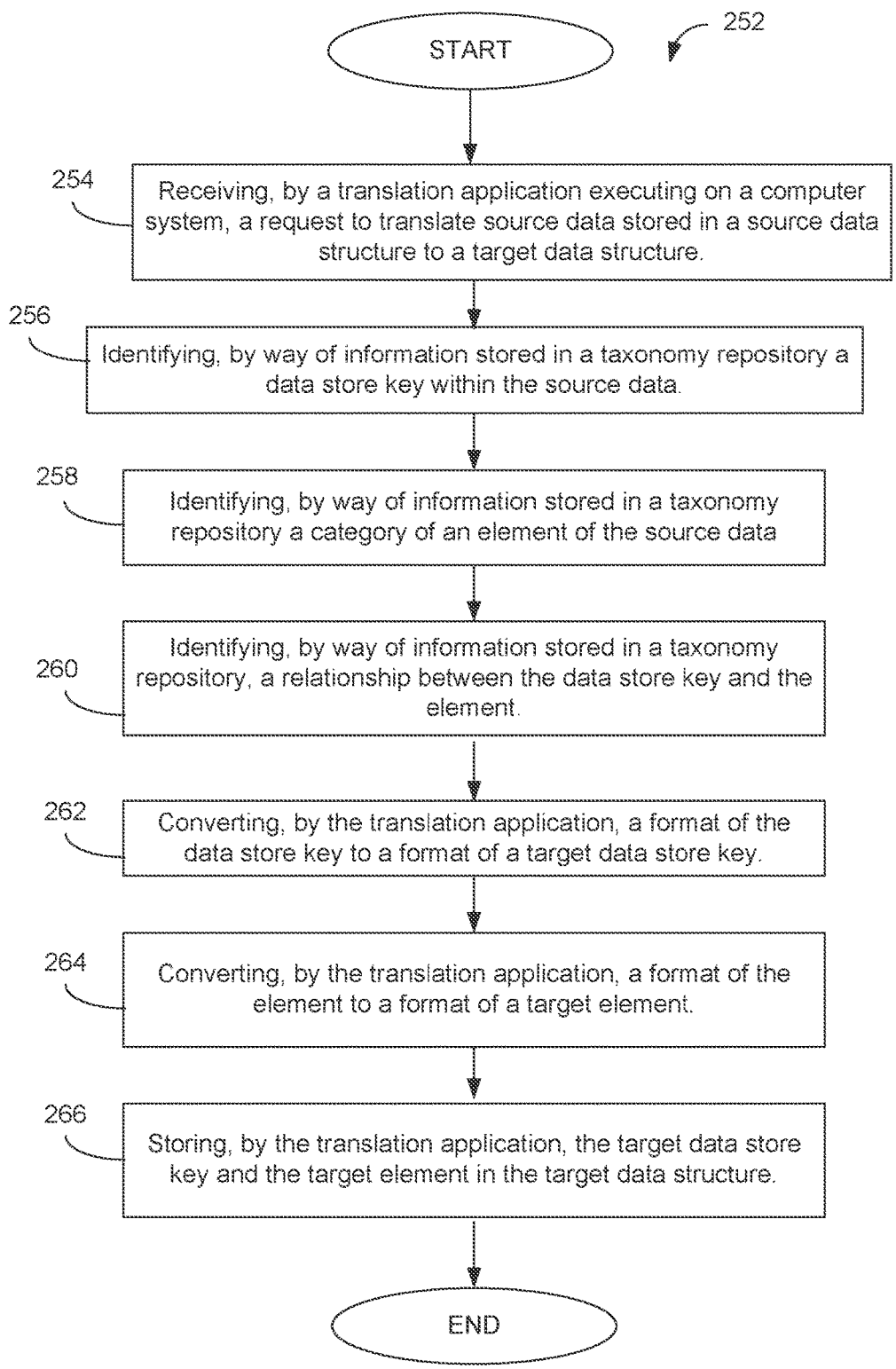
FIG. 7 is a flow chart illustrating a method according to an embodiment of the disclosure.

Turning now to FIG. 7, a method 252 is described in which an application receives a request to translate source data stored in a source data structure to a target data structure. In various embodiments, some of the blocks shown in FIG. 7 may be performed concurrently, in a different order than shown, or omitted. Additional method elements may be performed as desired. Additional method elements may be performed as desired.

At block 254, the method begins by receiving, by a translation application executing on a computer system, a request to translate source data stored in a source data structure to a target data structure. At block 256, the method proceeds by identifying, by way of information stored in a taxonomy repository a data store key within the source data.

Next, at block 258, the method continues by identifying, by way of information stored in a taxonomy repository 112 a category of an element of the source data. At block 260, the method continues by identifying, by way of information stored in a taxonomy repository, a relationship between the data store key and the element. At block 262, the method converts, by the translation application, a format of the data store key to a format of a target data store key.

At block 264, the method converts, by the translation application, a format of the element to a format of the target element. At block 266, the method concludes by storing, by the translation application, the target data store key and the target element in the target data structure.

Figure 8:
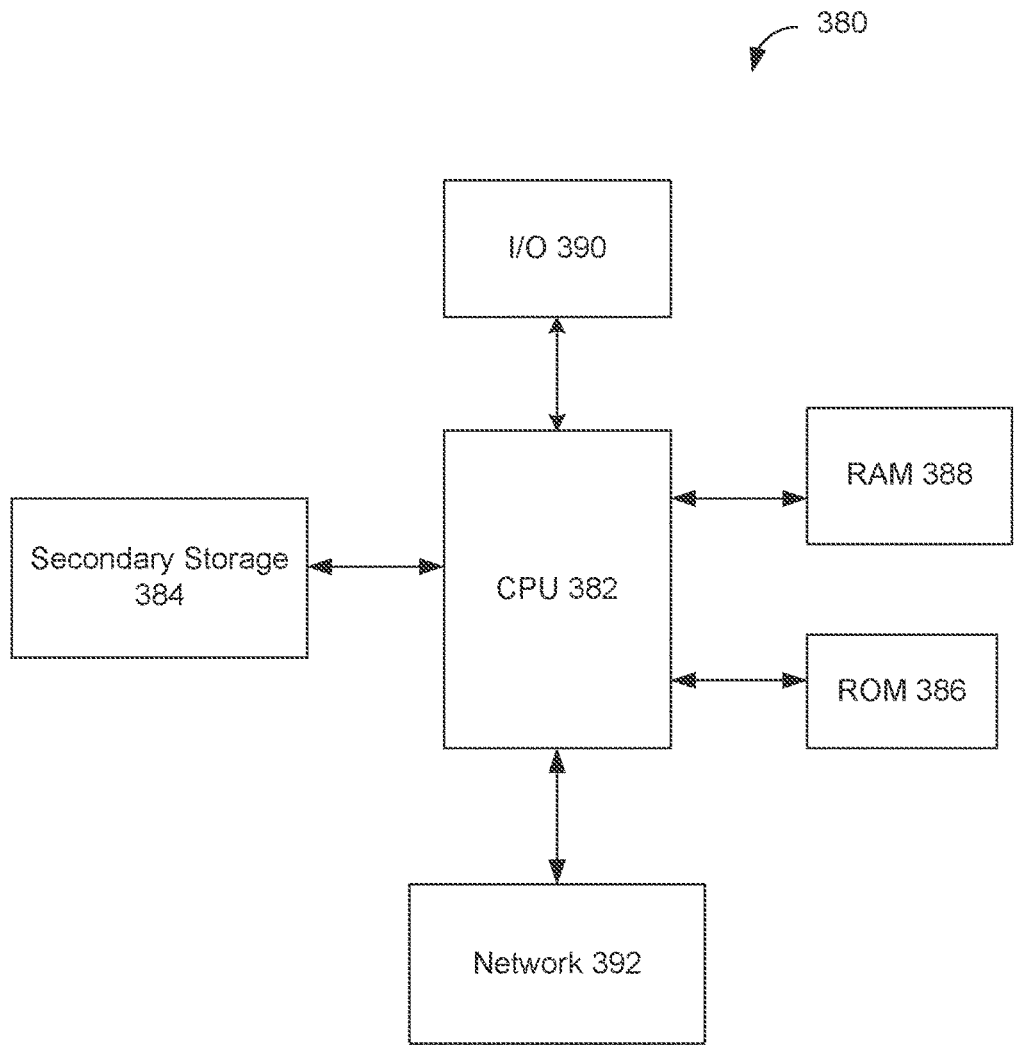
FIG. 8 is a block diagram illustrating an exemplary computer system suitable for implementing various aspects of an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets.

With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

The invention claimed is:

1. A telecommunication network computer system for converting source data in a source data structure to target data in a target data structure, where the source data structure and target data structure are arbitrarily selected from a plurality of at least fifty different data structures, comprising:
   a memory;
   a processor; and
   a program stored in the memory that, when executed by the processor causes the processor to:
      receive a request to translate source data in a source data structure to target data in a target data structure, the source data comprising one or more source tables stored in the source data structure, the one or more source tables comprising a data store key and a first element, wherein the source data structure is different from the target data structure; and
      automatically generate data store keys and inter-field relationships from the source data structure by further causing the processor to:
         based on information stored in a taxonomy repository:
            identify the data store key comprises key information;
            identify a category of the first element;
            identify a relationship between the data store key and the first element in the one or more source tables;
         convert a format of the data store key to a format of a target data store key, wherein when the processor converts the format of the data store key to the format of the target data store key, the program causes the processor to:
            identify a structure of the target data store key based on information in the taxonomy repository, the taxonomy repository defining a key structure compatible with the target data structure; and
            change a structure of the data store key to the structure of the target data store key;
         convert a format of the first element to a format of a target element; and
         store the target data store key and the target element in the target data structure.

2. The system of claim 1, the program, when executed further causes the processor to:
   receive a request to translate second source data in a second source data structure to the target data structure, the second source data structure different from the source data structure;
   identify that a redundant element in the second source data structure is in the target data structure; and
   refrain from translating the redundant element in the target data structure.

3. The system of claim 1, wherein the taxonomy repository comprises information about the source data structure and the target data structure corresponding to one selected from the group consisting of: a type of data, a format of data, a location of data, and a category of data.

4. The system of claim 1, wherein when the processor converts the format of the data store key to the format of the target data store key and converts the format of the first element to the format of the target element, the program further causes the processor to:

convert source data comprising the data store key and the first element to data to a generic format; and
convert the data in the generic format to the format of the target data store key and the target element.

5. The system of claim 1, wherein when the processor converts the format of the first element to the format of the target element the program causes the processor to:
identify the format of the target element based on information in the taxonomy repository, the taxonomy repository defining:
a location for the target element in the target data structure, and
a format of the target element based on a format of data stored in a column or row comprising the location for the target element within the target data structure; and
change the format of the first element to the format of the target element defined in the taxonomy repository,
wherein the format of the target element is at least one selected from the group consisting of: integer number; decimal number; long data; long raw data; and text.

6. The system of claim 1, wherein when the processor stores the target data store key the program causes the processor to:
identify a location for the target element based on information in the taxonomy repository, the taxonomy repository defining a column or row of data in the target data structure comprising data corresponding to the category of the first element; and
store a copy of the first element at the location.

7. A telecommunication network computer system for converting source data in a source data structure to target data in a target data structure, where the source data structure and target data structure are arbitrarily selected from a plurality of at least fifty different data structures, comprising:
a memory;
a processor; and
a program stored in the memory that, when executed by the processor causes the processor to:
receive a request to translate data from a source data structure to a target data structure, the source data structure comprising a first table of data and a second table of data;
infer relationships among fields by further causing the processor to:
access a taxonomy repository related to a database of a telecommunications entity and identify a relationship between elements in the source data structure based on information in the taxonomy repository;
access the taxonomy repository and identify a category of a column of data in the first table and a category of a column of data in the second table;
determine the categories of data are the same;
compare data in the column of data in the first table and in the column of data in the second table;
based on the comparison, determine that duplicate elements are present between the column of data in the first table and the column of data in the second table;
determine the first table comprises the data store of record based on information in the taxonomy repository; and
translate the first table of data and the second table of data to the target data structure, translating one instance of the duplicate elements in the target data structure from the first table, wherein when the processor translates the first table of data and the second table of data to the target data structure, the program causes the processor to:
identify a location to copy an element of the first table based on information in the taxonomy repository, the taxonomy repository defining:
a location for the target element in the target data structure, and
a format of the target element based on a format of data stored in a column or row comprising the location for the target element within the target data structure; and
change the format of the element to the format of the target element defined in the taxonomy repository.

8. The system of claim 7, wherein when the processor accesses the taxonomy repository and identifies the relationship between elements in the source data structure, the program causes the processor to:
identify, based on information in the taxonomy repository, a column of data in the first table as comprising a data store key; and
identify, based on information in the taxonomy repository, a relationship between the data store key and a second column of data in the first table of data.

9. The system of claim 7, wherein when the processor accesses the taxonomy repository and identifies the relationship between elements in the source data structure, the program causes the processor to:
based on information in the taxonomy repository,
identify a column of data in the first table as comprising a foreign data store key,
identify child data corresponding to the foreign data store key, the child data in a third table in the source data structure.

10. The system of claim 9, wherein when the processor translates the first table of data and the second table of data, the program further causes the processor to:
identify, based on information in the taxonomy repository, a structure of a data key stored in the target data structure; and
change a structure of the foreign data store key to the structure of the data key stored in the target data structure.

11. The system of claim 7, wherein when the processor translates the first table of data and the second table of data to the target data structure, the program causes the processor to:
identify, based on information in the taxonomy repository, a relationship between the first table of data and the second table of data; and
translate data from the first table of data and the second table of data such that the relationship between the tables is maintained in a format compatible with the target data structure.

12. The system of claim 7, wherein the taxonomy repository comprises metadata corresponding to the data in the source data structure, the metadata corresponds to at least one selected from the group consisting of: an identification of a type of data stored in the source data structure, a format of the data stored in the source data structure, a category of the data stored in the source data structure, a classification of the data stored in the source data structure, a location of the data stored in the source data structure, and a relationship between data stored in the source data structure.

13. A method of managing data in a telecommunication network data structure by converting source data in a source data structure to target data in a target data structure, where the source data structure and target data structure are arbitrarily selected from a plurality of at least 50 different data structures comprising:
  receiving, by a translation application executing on a telecommunication network computer system, a request to translate source data stored in a source data structure to a target data structure;
  identifying, by way of information stored in a taxonomy repository:
    a data store key within the source data;
    a category of an element of the source data;
  inferring, by way of information stored in the taxonomy repository, a relationship between the data store key and the element;
  converting, by the translation application, a format of the data store key to a format of a target data store key;
  converting, by the translation application, a format of the element to a format of a target element;
  storing, by the translation application, the target data store key and the target element in the target data structure;
  receiving a request to translate second data stored in a second data structure to the target data structure;
  identifying, based on information in the taxonomy repository, redundant and non-redundant data between the second data and source data;
  determining, by way of information stored in the taxonomy repository that the second data structure is not a data store of record; and
  translating the non-redundant data to the target data structure.

14. The method of claim 13, further comprising:
  identifying, by way of information stored in the taxonomy repository and by the translation application, a redundant element in the source data;
  determining, by way of information stored in the taxonomy repository, a data store of record for the redundant element in the source data; and
  translating the redundant element from the data store of record and refraining from translating the redundant element more than once such that a single instance of the redundant element is stored in the target data structure.

15. The method of claim 13,
  wherein the data store key is located in a parent table in the source data structure and the element is located in a child table in the source data structure;
  wherein identifying, by way of information stored in a taxonomy repository, a relationship between the data store key and the element, further comprises identifying the data store key is a foreign key to a column comprising the element in the child table.

16. The method of claim 13,
  wherein the source data comprises a source format, the source data stored in a source table comprising a source column comprising the element;
  wherein the target data comprises a target format different from a format of the source data;
  wherein converting, by the translation application, the format of the element to the format of the target element further comprises,
    determining the format of the target element, based on information stored in the taxonomy repository, the taxonomy repository defining:
      a location for the target element in the target data structure; and
      a format of the target element based on a format of data stored in a column or row comprising the location for the target element in the data structure.

17. The method of claim 13, wherein storing, by the translation application, the target data store key and the target element in the target data structure further comprises:
  translating source data to the target data structure such that relationships between tables in the source data are maintained in the target data structure, wherein the target data structure stores data in a different format from the source data structure.

* * * * *